United States Patent
Kim

(10) Patent No.: US 10,219,113 B2
(45) Date of Patent: Feb. 26, 2019

(54) IN-VEHICLE WIRELESS COMMUNICATION MANAGEMENT SYSTEM AND METHOD OF CONTROLLING SAME

(71) Applicants: HYUNDAI MOTOR COMPANY, Seoul (KR); KIA MOTORS CORPORATION, Seoul (KR)

(72) Inventor: Joon Young Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/805,874

(22) Filed: Nov. 7, 2017

(65) Prior Publication Data

US 2019/0007795 A1    Jan. 3, 2019

(30) Foreign Application Priority Data

Jun. 30, 2017 (KR) .......................... 10-2017-0083639

(51) Int. Cl.
| | |
|---|---|
| *H04W 24/00* | (2009.01) |
| *H04W 4/02* | (2018.01) |
| *H04W 4/04* | (2009.01) |
| *H04L 29/08* | (2006.01) |
| *G08G 1/16* | (2006.01) |
| *G08G 1/0967* | (2006.01) |

(52) U.S. Cl.
CPC ...... *H04W 4/023* (2013.01); *G08G 1/096791* (2013.01); *G08G 1/161* (2013.01); *H04L 67/12* (2013.01); *H04L 67/18* (2013.01); *H04W 4/046* (2013.01)

(58) Field of Classification Search
CPC ...................................................... H04W 4/023
See application file for complete search history.

(56) References Cited

U.S. PATENT DOCUMENTS

| | | | |
|---|---|---|---|
| 2014/0128090 A1* | 5/2014 | Lim ................... | H04W 52/244 455/452.2 |
| 2014/0179351 A1 | 6/2014 | Hannon | |
| 2015/0011229 A1* | 1/2015 | Morita ............... | H04W 52/244 455/448 |

FOREIGN PATENT DOCUMENTS

| | | |
|---|---|---|
| JP | 2009-139998 | 6/2009 |
| JP | 2014-230240 | 12/2014 |

(Continued)

*Primary Examiner* — Justin Y Lee
(74) *Attorney, Agent, or Firm* — Brinks Gilson & Lione

(57) ABSTRACT

The present disclosure provides an in-vehicle wireless communication management system and a method of controlling the same. A method for managing wireless communication between vehicles, where each of the vehicles is equipped with a near field wireless communication router, includes: acquiring, with a first router included in a first vehicle, power information from at least one wireless device located inside the first vehicle and from a second vehicle having a second router; determining whether interference occurs in near field wireless communication based on the power information; when it is determined that the interference occurs, determining a location of a source of the interference to be either an interior of the first vehicle or an exterior of the first vehicle; and depending on the location of the source of the interference, requesting power adjustment to either at least one wireless device or the second router such that the interference is mitigated.

17 Claims, 6 Drawing Sheets

(56) References Cited

FOREIGN PATENT DOCUMENTS

KR  10-20150040572  4/2015
KR  10-20120076782  12/2015

* cited by examiner

IN-VEHICLE WIRELESS COMMUNICATION MANAGEMENT SYSTEM AND METHOD OF CONTROLLING SAME

CROSS-REFERENCE TO RELATED APPLICATION

The present application claims priority to and the benefit of Korean Patent Application No. 10-2017-0083639, filed on Jun. 30, 2017, which is incorporated herein by reference in its entirety.

FIELD

The present disclosure relates to an in-vehicle wireless communication management system and a method of controlling the same and, more particularly, to a wireless communication management system for efficiently reducing wireless communication interference caused by devices inside or outside a vehicle according to a vehicle environment, and a method of controlling the same.

BACKGROUND

The statements in this section merely provide background information related to the present disclosure and may not constitute prior art.

A connected car is a car using information and communication technology (ICT). The connected car is capable of bilaterally exchanging information with an external device through a smart device, etc. and enables a real-time navigation function or remote vehicle control. The connected car is equipped with a wireless communication function to use internet and mobile services such as web surfing or multimedia content access. The connected car has a concept similar to telematics in that the car is associated with wireless communication.

Telematics provide services such as real-time vehicle location tracking, internet access, or traffic information, through wireless communication. As compared with telematics that provide fixed software-based services, the connected car allows more expanded and integrated services by configuring the car with an electronic control system. It is expected that a system for autonomous driving or accident prevention through sharing of information between vehicles using a wireless network, as opposed to connection between a smartphone and a vehicle, will be used. With introduction of the concept of this connected car, we have seen many cases in which a router for near field communication is mounted in a vehicle. The router for near field communication may be, for example, an in-vehicle Wi-Fi access point (AP). However, when routers for near field communication are installed in all vehicles, a wireless interference phenomenon may occur between vehicles or within a vehicle by routers for near field communication of neighbor vehicles or by smart devices served through the routers, in heavy traffic such as in a downtown driving situation or a platoon driving situation.

Accordingly, a method of sensing whether a wireless interference phenomenon has occurred and efficiently solving the interference phenomenon according to the result of sensing is desired.

SUMMARY

The present disclosure provides an in-vehicle wireless communication management system capable of efficiently solving a wireless interference phenomenon in a vehicle environment, and a method of controlling the same.

The present disclosure also provides an in-vehicle wireless communication management system capable of sensing and solving a wireless interference phenomenon caused by devices inside or outside a vehicle in a vehicle environment, and a method of controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one aspect of the present disclosure, a method for managing wireless communication between vehicles, where each of the vehicles is equipped with a near field wireless communication router, includes: acquiring, with a first router included in the first vehicle, power information from at least one wireless device located inside the first vehicle and from a second vehicle having a second router; determining whether interference occurs in near field wireless communication based on the power information; when it is determined that the interference occurs, determining a location of a source of the interference to be either an interior of the first vehicle or an exterior of the first vehicle; and requesting power adjustment to either at least one wireless device or the second router such that the interference is mitigated depending on the location of the source of the interference.

In another aspect of the present disclosure, an in-vehicle wireless communication management system for managing wireless communication interference in a vehicle environment includes: a wireless communication unit configured to acquire power information from at least one wireless device located inside a vehicle and from an external vehicle having a router, and a controller configured to: determine whether interference occurs in near field wireless communication based on the power information; when it is determined that the interference occurs, determine a location of a source of the interference to be either an interior of the vehicle or an exterior of the vehicle; and request power adjustment to either at least one wireless device or the router such that the interference is mitigated depending on the location of the source of the interference.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
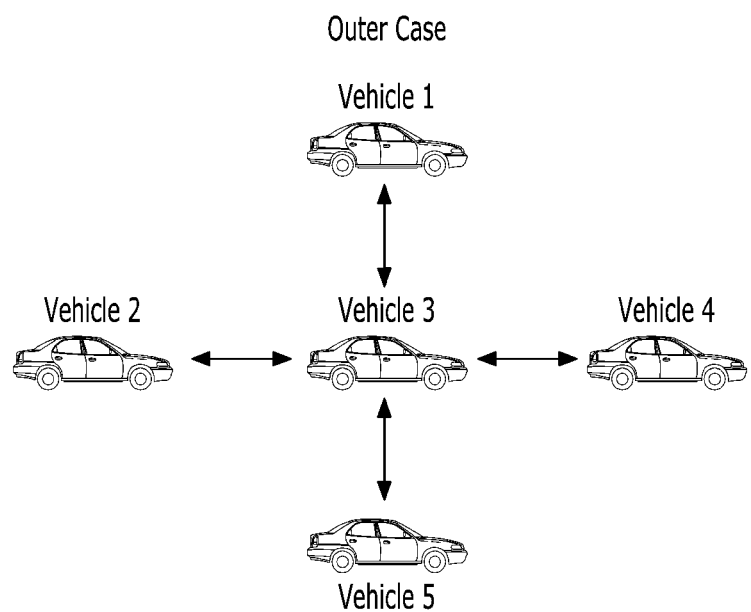
FIGS. 1A and 1B illustrate an exemplary vehicle environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, examples of which are illustrated in the accompanying drawings. Wherever possible, the same reference numbers will be used throughout the drawings to refer to the same or like parts.

Some forms of the present disclosure propose an in-vehicle wireless communication management system capable of efficiently solving interference by determining problematic devices and performing power control in a downtown driving situation or a platoon driving situation, i.e., in a situation in which interference may occur in near field wireless communication by dense congestion of a plurality of devices, and a method of controlling the same. An environment and basic assumption to which the forms of the present disclosure are applicable will now be described with reference to FIGS. 1A and 1B.

Figure 1B:
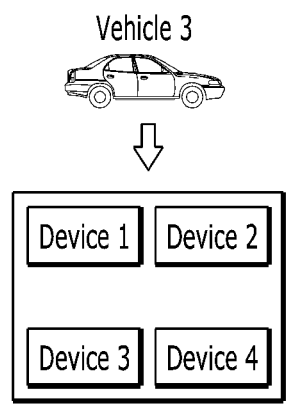

FIGS. 1A and 1B illustrate an exemplary vehicle environment in some forms of the present disclosure.

Referring to FIG. 1A, a total of five vehicles Vehicle 1 to Vehicle 5, focusing on Vehicle 3, is illustrated. Hereinbelow, the roles and functions of an in-vehicle wireless communication management system in some forms of the present will be described based on Vehicle 3 and the other vehicles will be considered as subjects that create interference in terms of Vehicle 3 or subjects that take measures to mitigate interference according to a request of an in-vehicle wireless communication management system mounted in Vehicle 3. However, this is purely for convenience of description and it is obvious that other vehicles also perform the same functions as or similar functions to Vehicle 3 when the in-vehicle wireless communication management system according to the present disclosure is provided. It is also apparent that an actual distance between vehicles, relative positions of vehicles, and presence/absence of vehicles may vary in various manners according to an actual vehicle travel environment. However, it is assumed that each vehicle includes at least a router for near field communication and a data communication path between vehicles is preset according to a predetermined protocol to wirelessly exchange data between vehicles.

Meanwhile, as illustrated in FIG. 1B, one vehicle may include a plurality of devices and the devices may be mounted therein or may be possessed by a user. It is assumed that devices mentioned hereinbelow can perform a near field communication function through a router mounted in a vehicle.

For convenience of description, a wireless communication router mounted in a vehicle is assumed to be an in-vehicle Wi-Fi router and each device performs communication according to a Wi-Fi protocol by accessing each router. Herein, the Wi-Fi protocol, as a near field communication means, is purely exemplary. The present disclosure is not limited to such a Wi-Fi protocol and may be applied to any protocol if the protocol can provide a near field communication service to various devices.

Hereinafter, an interference mitigation method through the in-vehicle wireless communication management system in some forms of the present disclosure will be described based on the above assumptions.

Figure 2:
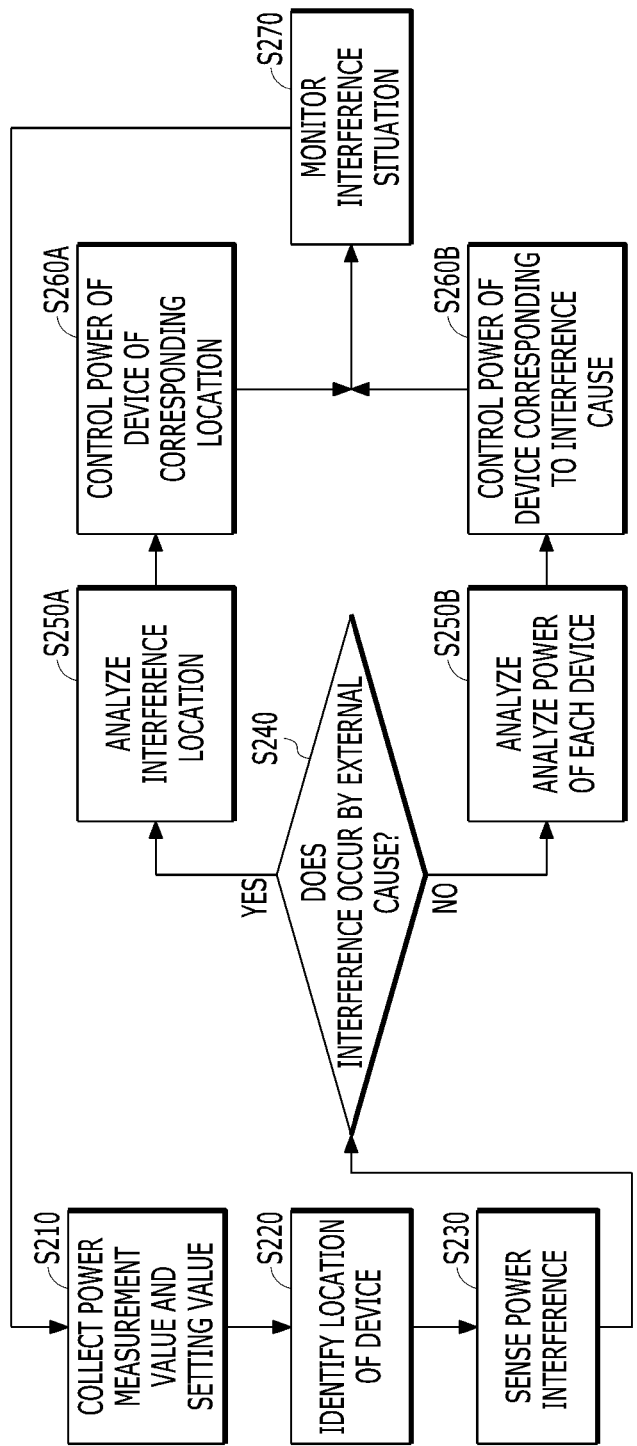
FIG. 2 is a flowchart illustrating an exemplary interference mitigation method.

FIG. 2 is a flowchart illustrating an exemplary interference mitigation method in some forms of the present disclosure.

Referring to FIG. 2, the in-vehicle wireless communication management system in some forms of the present disclosure may collect a Wi-Fi power measurement value and a setting value per device (S210). To this end, the in-vehicle wireless communication management system may collect at least one of i) information about whether communication between a Wi-Fi router of a vehicle and a device can be performed, ii) information about a broadcast list and the reception power of each device received from the Wi-Fi router, iii) information about the power of a router of each adjacent vehicle, and iv) information about location of each adjacent vehicle.

The wireless communication management system may identify the location of a device using the collected information (S220). For example, the wireless communication management system may determine the location of a router of each vehicle using global positioning system (GPS) information of a vehicle in which the wireless communication management system is mounted and using received GPS information of each adjacent vehicle. In addition, the wireless communication management system may determine information about a relative or absolute location of each device through signal strength values of devices in a vehicle. Triangulation using a plurality of antennas may be used to determine the information about the absolute location of each device but the present disclosure is not limited thereto.

The wireless communication management system may determine whether interference occurs between devices in the vehicle using the collected information (S230) and determine whether the interference occurs by an internal cause or an external cause (S240). For example, as a result of confirming received signal strength indicators (RSSIs) of the devices in the vehicle, if there is no problem in the devices of the vehicle, the wireless communication management system may determine that the interference is caused by the exterior of the vehicle. This will be described in detail with reference to FIGS. 3 to 6.

If the interference is analyzed as being caused by the exterior of the vehicle, the wireless communication management system may analyze the location of the external interference (S250A) and perform power control of a device of the corresponding location (S260A). If the interference is analyzed as being caused by the interior of the vehicle, the wireless communication management system may analyze the power of each device in the vehicle (S250B) and perform power control of a device corresponding to the source of the interference determined as a result of analysis (S260B).

After performing power control (S260A/S260B), the wireless communication management system may continue to monitor an interference situation (S270) and, to this end, the wireless communication management system may repeatedly perform the previous steps.

Figure 3:
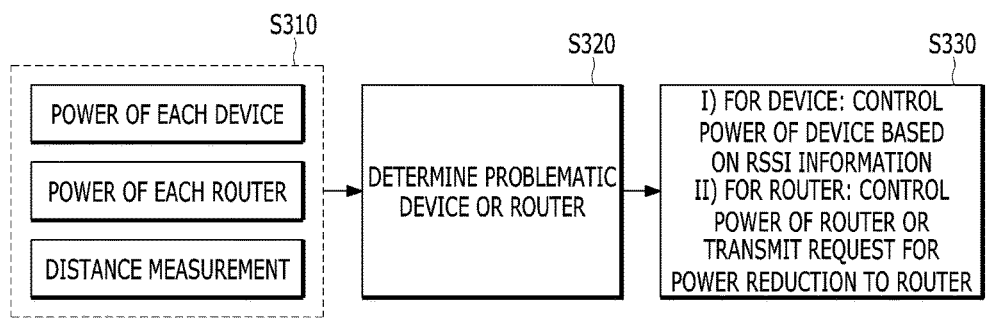
FIGS. 3 and 4 are flowcharts illustrating an exemplary interference mitigation procedure per interference occurrence location.
Figure 4:
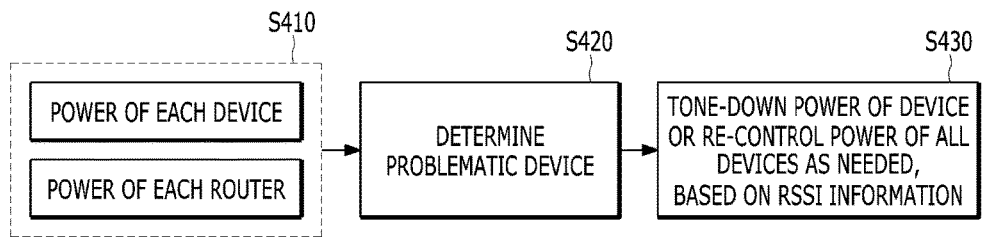

FIGS. 3 and 4 are flowcharts illustrating an exemplary interference mitigation procedure per interference occurrence location in some forms of the present disclosure.

Referring to FIG. 3, an interference mitigation procedure is illustrated when interference occurs externally. First, the wireless communication management system acquires power information of a router installed in each external vehicle, location information (e.g., GPS coordinate information) of the external vehicle, and power information of each device in the external vehicle, from the external vehicle (S310). The wireless communication management system may determine a problematic device or router using the acquired information (S320). As a result of determination, if a router of a specific external vehicle is problematic, the wireless communication management system may request that the corresponding external vehicle adjust the power of the router. If the request fails, the wireless communication management system may perform a control operation of adjusting the power of a device in a vehicle in which the wireless communication management system is mounted so as to deviate from an influence of interference from an external router (S330).

In addition, as illustrated in FIG. 4 if interference occurs internally, the wireless communication management system may acquire power information of a device and a router in a vehicle (S410). If any device is determined to be a problematic device through the acquired information (S420), the wireless communication management system may attempt to lower the power of the problematic device or re-adjust the power of all devices according to necessity, based on RSSI information (S430).

Hereinafter, a detailed interference mitigation control procedure will be described with reference to FIGS. 5A to 6C.

FIGS. 5A to 5D illustrate an exemplary interference mitigation control procedure performed in a wireless communication management system when occurrence of interference is caused by the exterior of a vehicle.

After Vehicle 3 detects interference and determines that the cause of interference is not present in the interior of the vehicle as a result that of analyzing RSSIs of internal devices, a situation illustrated in FIG. 5 is assumed.

Figure 5A:
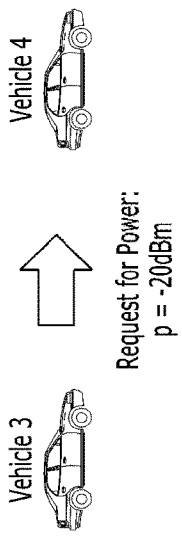
FIGS. 5A to 5D illustrate an exemplary interference mitigation control procedure performed in a wireless communication management system when occurrence of interference is caused by the exterior of a vehicle.

Referring to FIG. 5A, the wireless communication management system may acquire GPS coordinate information (x4, y4) and power information of a router from Vehicle 4. In this case, the GPS coordinate information and the power information of the router may be transmitted together with identification information of each vehicle or router.

Figure 5C:
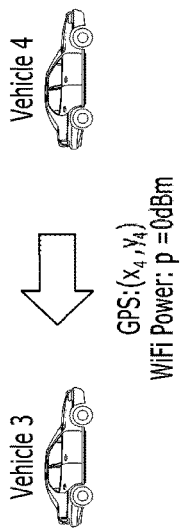
Figure 5B:
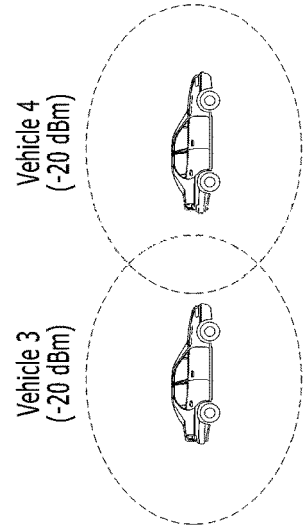

The wireless communication management system may obtain information about a distance $d=\sqrt{(x_3-x_4)^2+(y_3-y_4)^2}$ between vehicles using GPS coordinates (x3, y3) thereof and the GPS coordinates (x4, y4) of Vehicle 4, as illustrated in FIG. 5B. In addition, the wireless communication management system may determine the magnitude of an influence (i.e., "valid interference power") on Vehicle 3 by the power of the router of Vehicle 4 according to the distance between vehicles, using the relationship $$\left(p \propto \frac{1}{d^2}\right)$$

between the received power of Vehicle 4 and the distance between vehicles. The wireless communication management system may calculate a proper power (e.g., −20 dBm) of the router of Vehicle 4 which does not create interference with respect to Vehicle 3 at the determined location.

If a current power of Vehicle 4 is higher than the calculated proper power, the wireless communication management system may request that Vehicle 4 reduce the power of the router to a proper power as illustrated in FIG. 5C.

Figure 5D:
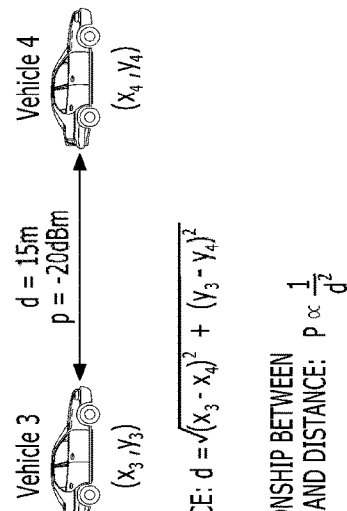

As illustrated in FIG. 5D, if Vehicle 4 adjusts the power of the router according to request, the interference mitigation procedure may be completed. However, if Vehicle 4 denies the request or the request fails to be transmitted to Vehicle 4, the wireless communication management system of Vehicle 3 solves interference caused by Vehicle 4 by raising the power of a device in Vehicle 3 as measures within Vehicle 3.

Figure 6A:
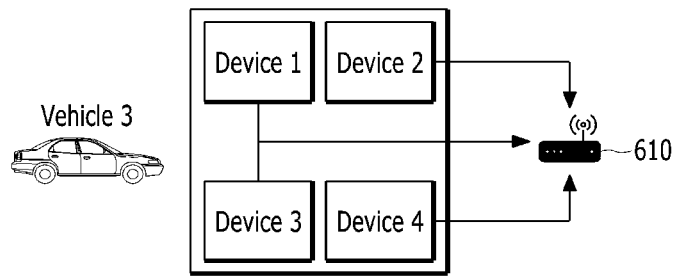
FIGS. 6A to 6C illustrate an exemplary interference mitigation control procedure performed in a wireless communication management system when occurrence of interference is caused by the interior of a vehicle.
Figure 6B:
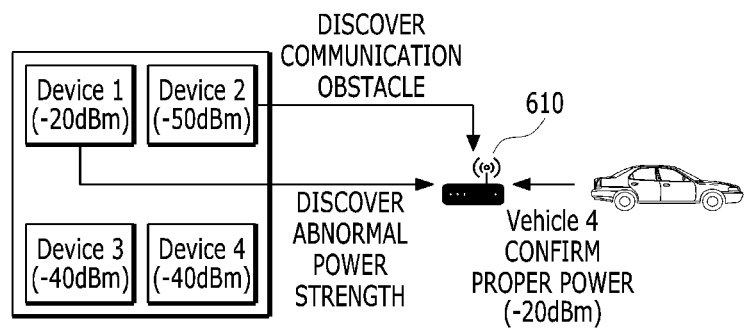
Figure 6C:
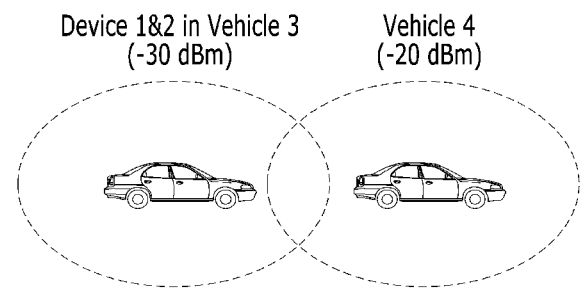

FIGS. 6A to 6C illustrate an exemplary interference mitigation control procedure performed in a wireless communication management system when occurrence of interference is caused by the interior of a vehicle.

Referring to FIG. 6A, Wi-Fi power information of each device may be received from a router of Vehicle 3. Then, the wireless communication management system may determine the location of each device based on the received information and calculate the transmission and reception power of each device in consideration of distance degradation according to a result of determination.

As illustrated in FIG. 6B, the wireless communication management system may determine that a communication obstacle of −50 dBm occurs in Device 2 due to an influence of interference by an RSSI of −20 dBm in Device 1. To mitigate this interference, the wireless communication management system of Vehicle 3 may search for optimal RSSIs of devices creating interference through a power control test in units of predetermined decibels (dBm) in a router and perform power control through the searched value.

For example, the power control test may be performed in units of 10 dBm as shown in Table 1.

TABLE 1

| Device 1 | Device 2 | Interference mitigation? |
|---|---|---|
| −40 dBm | −40 dBm | Yes |
| −40 dBm | −30 dBm | Yes |
| −40 dBm | −20 dBm | No |
| −30 dBm | −40 dBm | Yes |
| −30 dBm | −30 dBm | Yes |
| −30 dBm | −20 dBm | No |

Referring to Table 1, the wireless communication management system may perform an optimal RSSI test between devices while changing the power of each device and simultaneous connection between devices. As a result of the test, if a maximum RSSI at which interference does not occur in both devices is −30 dBm, then −30 dBm may be determined to be an optimal RSSI of both devices.

Meanwhile, together with determination of the optimal RSSI, it may be determined whether the transmission and reception power of an adjacent vehicle, for example, Vehicle 4, creates interference with respect to Vehicle 3.

In addition, as illustrated in FIG. 6C, it may be also determined whether power control of Device 1 and Device 2 in Vehicle 3 may cause interference with respect to an adjacent vehicle. For example, if it is determined, as a result of a test of possibility of interference of Vehicle 4, that a current power of a router of Vehicle 4 is −15 dBm and a distance calculated using GPS coordinates is 100 m which is sufficiently long, the wireless communication management system may determine that power control does not create interference with respect to Vehicle 4, thereby completing interference mitigation control.

Hereinafter, the in-vehicle wireless communication management system for implementing the above-described forms will be described based on an assumption that the in-vehicle wireless communication management system is implemented by an audio/video/navigation (AVN) system (or AVN controller) of a vehicle.

Figure 7:
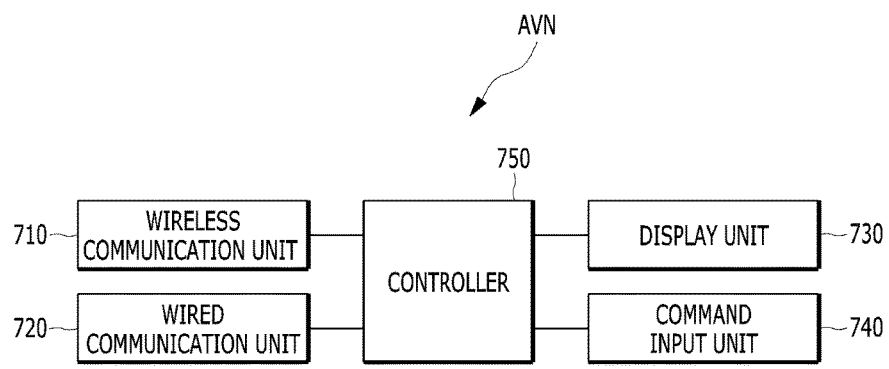
FIG. 7 is a block diagram illustrating an exemplary AVN system.

FIG. 7 is a block diagram illustrating an exemplary AVN system in some forms of the present disclosure.

Referring to FIG. 7, an AVN system of a vehicle may include a wireless communication unit 710, a wired communication unit 720 for exchanging a signal with other components of the vehicle in a wired manner, a display unit 730 for displaying a list of various functions or an execution screen and a navigation screen, a command input unit 740 for receiving a command input through a dial, a touchpad, or a key button from a driver, and a controller 750 for controlling the aforementioned components and performing determination and calculation required to implement some forms of the present disclosure.

Herein, the wireless communication unit may include the afore-described near-field communication router or an additional router may be connected through the wired communication unit 720. In addition, a GPS module may be included in the AVN system or may be connected to an additional GPS module through the wired communication unit 720.

The controller 750 may control the wireless communication unit 710 or the wired communication unit 720 such that a connection process may be performed to establish a data exchange path with various devices (e.g., a smart device in a vehicle, another vehicle, a router of another vehicle, etc.). The controller 710 may perform overall control for the above-described interference mitigation, including receiving power information, location information, and setting information from a device in a vehicle or from another vehicle, determining whether interference occurs using the received information, determining an interference occurrence location, determining a specific power control target for interference mitigation, and requesting power control.

It is apparent to one of ordinary skill in the art that the configuration of FIG. 7 is purely exemplary and greater or fewer components than those shown in FIG. 7 may be included as necessary. For example, the wireless communication unit 710 may be included in a controller present outside the AVN system and a sound output unit for outputting a multimedia or navigation announcement voice or warning sound may be further included in the AVN system. In addition, functions of the in-vehicle wireless communication management system in some forms of the present disclosure may be distributed and implemented by one or more other controllers. In this case, components for performing functions of the corresponding controller may be further included in or unnecessary components may be excluded from the configuration of FIG. 7. In addition, the in-vehicle wireless communication management system may be implemented by a separate controller for performing the functions thereof.

According to at least one form of the present disclosure described above, wireless communication management can be more efficiently performed in a vehicle environment.

In particular, an interference phenomenon can be efficiently solved through different measures according to the location of an interference sensed in a vehicle environment.

The effects that can be achieved through the present disclosure are not limited to what has been particularly described hereinabove and other effects not described herein will be more clearly understood by persons skilled in the art from the above description.

The present disclosure may be implemented as computer-readable code that can be written on a computer-readable medium in which a program is recorded. The computer-readable medium may be any type of recording device in which data that can be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for managing wireless communication between vehicles, where each of the vehicles is equipped with a near field wireless communication router, the method comprising:
  acquiring, with a first router included in a first vehicle, power information from at least one wireless device located inside the first vehicle and from a second vehicle having a second router;
  determining whether interference occurs in near field wireless communication based on the power information;
  when it is determined that the interference occurs, determining a location of a source of the interference to be either an interior of the first vehicle or an exterior of the first vehicle; and
  depending on the location of the source of the interference, requesting power adjustment to either the at least one wireless device or the second router such that the interference is mitigated,
  wherein determining the location of the source of the interference comprises:
    determining a received signal strength indicator (RSSI) of any wireless device of a plurality of wireless devices;
    when the RSSI is not problematic, determining that the location of the source of the interference is the exterior of the first vehicle; and
    when the RSSI is problematic, determining that the location of the source of the interference is the interior of the first vehicle.

2. The method of claim 1, wherein acquiring the power information further comprises:
  wirelessly acquiring location information of the second vehicle and a power of the second router.

3. The method of claim 2, wherein determining whether interference occurs further comprises:
  determining a distance between the first vehicle and the second vehicle based on the location information of the second vehicle and location information of the first vehicle; and
  determining a valid interference power by applying the power of the second router to the distance between the vehicles.

4. The method of claim 3, wherein requesting the power adjustment comprises:

determining a proper power of the second router based on the distance between the first vehicle and the second vehicle, wherein the second router is configured to mitigate the interference; and when the power of the second router is greater than the proper power, requesting that the second vehicle operate the second router with the proper power.

5. The method of claim 4, further comprising:

when requesting that the second vehicle operate the second router with the proper power fails, controlling a power of any wireless device of the plurality of wireless devices.

6. The method of claim 3, wherein requesting the power adjustment comprises:

when it is determined that the location of the source of the interference is the interior of the first vehicle, selecting at least two wireless devices among the plurality of wireless devices, wherein the at least two wireless devices are configured to create mutual interference;

determining an optimal RSSI of each of the at least two wireless devices; and requesting that each of the at least two wireless devices operate with the optimal RSSI.

7. The method of claim 6, wherein determining the optimal RSSI comprises:

converting the RSSI of the at least two wireless devices to a predetermined unit; and determining a maximum RSSI as the optimal RSSI, wherein the maximum RSSI does not create the mutual interference as a result of converting the RSSI.

8. The method of claim 6, further comprising:

when the optimal RSSI is applied, determining whether the at least two wireless devices generates interference to the second vehicle.

9. A non-transitory computer-readable recording medium having a program recorded thereon, the program to direct a processor to:

acquire, with a first router included in a first vehicle, power information from at least one wireless device located inside the first vehicle and from a second vehicle having a second router;

determine whether interference occurs in near field wireless communication based on the power information;

when it is determined that the interference occurs, determine a location of a source of the interference to be either an interior of the first vehicle or an exterior of the first vehicle;

determine a received signal strength indicator (RSSI) of any wireless device of a plurality of wireless devices;

when the RSSI is not problematic, determine that the location of the source of the interference is the exterior of the first vehicle;

when the RSSI is problematic, determine that the location of the source of the interference is the interior of the first vehicle; and depending on the location of the source of the interference, request power adjustment to either the at least one wireless device or the second router such that the interference is mitigated.

10. An in-vehicle wireless communication management system for managing wireless communication interference in a vehicle environment, comprising:

a wireless communication unit configured to acquire power information from at least one wireless device located inside a vehicle and from an external vehicle having a router; and a controller configured to:

determine whether interference occurs in near field wireless communication based on the power information;

determine a location of a source of the interference to be either an interior of the vehicle or an exterior of the vehicle when it is determined that the interference occurs;

request power adjustment to either the at least one wireless device or the router such that the interference is mitigated depending on the location of the source of the interference;

determine a received signal strength indicator (RSSI) of any wireless device of a plurality of wireless devices;

determine that the location of the source of the interference is the exterior of the vehicle when the RSSI is not problematic; and determine that the location of the source of the interference is the interior of the vehicle when the RSSI is problematic.

11. The in-vehicle wireless communication management system of claim 10, wherein the wireless communication unit is configured to wirelessly acquire location information of the external vehicle and a power of the router.

12. The in-vehicle wireless communication management system of claim 11, wherein the controller is configured to:

determine a distance between the vehicles based on the location information of the external vehicle and location information of the vehicle; and determine a valid interference power by applying the power of the second router to the distance between the vehicles.

13. The in-vehicle wireless communication management system of claim 12, wherein the controller is configured to:

determine a proper power of the router based on the distance between the vehicles, wherein the router is configured to mitigate the interference; and when the power of the router is greater than the proper power, request that the external vehicle operate the router with the proper power.

14. The in-vehicle wireless communication management system of claim 13, wherein the controller is configured to control a power of any wireless device of the plurality of wireless devices when the requesting that the external vehicle operate the router with the proper power fails.

15. The in-vehicle wireless communication management system of claim 12, wherein the controller is configured to:

select at least two wireless devices among the plurality of wireless devices, wherein the at least two wireless devices are configured to create mutual interference when it is determined that the location of the source of the interference is the interior of the vehicle;

determine an optimal RSSI of each of the at least two wireless devices; and request that each of the at least two wireless devices operate with the optimal RSSI.

16. The in-vehicle wireless communication management system of claim 15, wherein the controller is configured to:

convert the RSSI of the at least two wireless devices to a predetermined unit; and determine that a maximum RSSI as the optimal RSSI, wherein the maximum RSSI does not create the mutual interference as a result of converting the RSSI.

17. The in-vehicle wireless communication management system of claim 15, wherein the controller is configured to determine whether the at least two wireless devices generates interference to the external vehicle when the optimal RSSI is applied.

\* \* \* \* \*